United States Patent [19]

Harrell, Jr.

[11] 4,381,375

[45] Apr. 26, 1983

[54] METHOD FOR VULCANIZING ETHYLENE/ACRYLIC OR VINYL ESTER/GLYCIDYL(METH) ACRYLATE COPOLYMER WITH PIPERAZINIUM DIPHENOXIDE SALT OF CHLORO-SUBSTITUTED PHENOL

[75] Inventor: Leon L. Harrell, Jr., Wilmington, Del.

[73] Assignee: E. I. Du Pont de Nemours and Company, Wilmington, Del.

[21] Appl. No.: 334,894

[22] Filed: Dec. 28, 1981

[51] Int. Cl.³ ............................................. C08L 33/08
[52] U.S. Cl. ................................................. 525/359.2
[58] Field of Search ...................................... 525/359.2

[56] References Cited

U.S. PATENT DOCUMENTS

| | | | |
|---|---|---|---|
| 2,981,721 | 4/1961 | Brown | 260/80.7 |
| 3,440,200 | 4/1969 | Lindemann et al. | 260/29.6 |
| 3,498,875 | 3/1970 | Lindemann et al. | 161/170 |
| 3,519,610 | 7/1970 | Huntzinger | 260/89.5 |
| 3,645,952 | 2/1972 | Lindemann et al. | 260/29.6 T |
| 3,761,454 | 9/1973 | Geri et al. | 260/80.77 |
| 4,070,532 | 1/1978 | Hammer | 526/11.2 |
| 4,157,428 | 6/1979 | Hammer | 521/134 |

*Primary Examiner*—Maurice J. Welsh

[57] ABSTRACT

Elastomeric ethylene/acrylic or vinyl ester/glycidyl(meth)acrylate copolymers, optionally containing carbon monoxide moieties, are cured with piperazinium diphenoxide salts, e.g. piperazinium di-(2-chloro-4-nitrophenoxide).

12 Claims, No Drawings

METHOD FOR VULCANIZING ETHYLENE/ACRYLIC OR VINYL ESTER/GLYCIDYL(METH) ACRYLATE COPOLYMER WITH PIPERAZINIUM DIPHENOXIDE SALT OF CHLORO-SUBSTITUTED PHENOL

DESCRIPTION

Technical Field

This invention relates to vulcanizable elastomeric compositions, and to a method for curing such compositions, which method is fast and has satisfactory processing safety (scorch resistance), the composition comprising an ethylene/acrylic or vinyl ester/glycidyl(meth)acrylate copolymer, and optionally, carbon monoxide and the method of curing such copolymers comprising reaction of the compositions of the present invention with certain piperazinium diphenoxide salts.

Background Art

Copolymers of ethylene, an acrylic or vinyl ester, glycidyl(meth)acrylate and, optionally, carbon monoxide are disclosed in U.S. Pat. Nos. 4,070,532 and 4,157,428, issued Jan. 24, 1978 and June 5, 1979, respectively, both to Hammer. These copolymers are normally vulcanized in the presence of metal oxides or hydroxides or polyamines, corresponding ionic cross-links being formed. U.S. Pat. No. 3,519,610 issued July 7, 1970 to Huntzinger discloses vulcanizable compositions of polyacrylate elastomers and a curing agent consisting of a salt of triethylenediamine or methyl triethylenediamine and a mono-, di- or trisubstituted alkyl phenol. U.S. Pat. No. 3,093,613 issued June 11, 1963 to Fusco et al. discloses the vulcanizaton of butyl rubber with halomethyl hydrocarbon-substituted phenols. Vulcanizable compositions of an ethylene/acrylic or vinyl ester/glycidyl(meth)acrylate/carbon monoxide copolymer and a piperazinium diphenoxide salt are not described in the prior art, however.

DISCLOSURE OF THE INVENTION

The copolymers vulcanized according to this invention contain by weight (a) from 30 to 70%, preferably 35 to 50%, of ethylene; (b) from 25 to 65%, preferably 50 to 60%, of an acrylic ester or vinyl ester; (c) from 2 to 10%, preferably 2 to 5%, of glycidyl acrylate or methacrylate and most preferably 3 to 3.5% glycidyl methacrylate; and (d) from 0 to 15%, preferably 5 to 10%, of carbon monoxide, the weights of (a), (b), (c) and (d) adding up to 100%.

Acrylic esters include alkyl acrylates or methacrylates wherein the alkyl group contains from 1 to 4 carbon atoms. Specific examples include methyl acrylate, ethyl acrylate, propyl acrylate, isopropyl acrylate or a butyl acrylate, ethyl methacrylate, propyl methacrylate, isopropyl methacrylate or a butyl methacrylate. Suitable vinyl esters include vinyl acetate, vinyl propionate and vinyl butyrate.

The preferred copolymers of the present invention will contain by weight approximately 42.4% ethylene, 54.4% methyl acrylate or vinyl acetate and 3.2% of glycidyl methacrylate.

The copolymers of the present invention can be prepared by copolymerizing ethylene, a comonomer solution of the acrylic ester or vinyl ester, and glycidyl(meth)acrylate and, when present, carbon monoxide in a methanol-t-butanol solvent mixture in a pressure reactor at 160° to 225° C. and a pressure of 150 to 200 MPa in the presence of a free-radical polymerization initiator as generally described in U.S. Pat. No. 3,883,472 to Greene and Lewis and U.S. Pat. No. 4,026,851 and U.S. Pat. No. 3,904,588, both to Greene. The comonomer solution preferably contains from 22 to 44 ppm of a stabilizer such as phenothiazine. The free-radical polymerization initiator is dissolved in a mixture of methanol and t-butanol. The polymerization is run as a continuous process wherein ethylene, comonomer solution, solvent and initiator solution are fed continuously into the stirred autoclave. The addition rates depend on variables such as the polymerization temperature, pressure, monomers employed and the concentration of the monomers in the reaction mixture.

For example, a 44.5 weight percent ethylene/52.1 weight percent methyl acrylate/3.4 weight percent glycidyl methacrylate copolymer having a melt index of 8.7 was prepared by continuously feeding ethylene, methyl acrylate, glycidyl methacrylate and t-butyl alcohol/methyl alcohol solvent (80/20 by weight) into a stirred autoclave at 186 MPa and 179°–180° C. at feed rates of 12.6 kg/s × $10^4$, 1.56 kg/s × $10^4$, 0.082 kg/s × $10^4$ and 3.02 kg/s × $10^4$, respectively. Tert-butyl peroxypivalate initiator was introduced continuously at a rate 0.5–0.6 kg per 100 kg of copolymer. The reaction mixture was continuously removed from the autoclave and was stripped of unpolymerized monomers and solvent under reduced pressure and at elevated temperatures. Details of the synthesis of this copolymer and three others is summarized in Table I.

TABLE I

COPOLYMER SYNTHESIS

| Copolymer No. | Product Copolymer Co-polymer Type | Monomer Ratio (Wt., %) | Melt Index | Reaction Conditions Pressure MPa | Temp. (°C.) | PL Initiator Demand[1] | Feed Rate, kg/s × $10^4$ E | MA | CO | GMA | Solvent[2] | Conversion % |
|---|---|---|---|---|---|---|---|---|---|---|---|---|
| A | E/MA/GMA | 44.5/ 52.1/ 3.4 | 8.7 | 186 | 179–180 | 0.5–0.6 | 12.6 | 1.56 | — | 0.082 | 3.02 | 11.3 |
| B | E/MA/GMA | 43.6/ 53.8/ 2.6 | 6.9 | 186 | 180–181 | 0.36–0.55 | 12.6 | 1.57 | — | 0.063 | 3.25 | 11.3 |
| C | E/VA/GMA | 68.7/ 28.6/ 2.7 | 25.5 | — | — | — | — | — | — | — | — | — |
| D | E/MA/CO/ GMA | 58.6/ 29.6/ 7.4/ | 2.6 | 172 | 190–192 | 2.80–2.94 | 17.6 | 1.02 | 0.39 | 0.15 | 2.82 | 12.4 |

TABLE I-continued

COPOLYMER SYNTHESIS

| Copoly- mer No. | Co- polymer Type | Product Copolymer Monomer Ratio (Wt., %) | Melt Index | Reaction Conditions | | | | | | | Conversion % |
|---|---|---|---|---|---|---|---|---|---|---|---|
| | | | | Pressure MPa | Temp. (°C.) | PL Initiator Demand[1] | Feed Rate, kg/s × 10$^4$ | | | | |
| | | | | | | | E | MA | CO | GMA | Solvent[2] |
| | | 4.5 | | | | | | | | | |

PL = t-butyl peroxypivalate; E = ethylene; MA = methyl acrylate; GMA = glycidyl methacrylate; VA = vinyl acetate
[1]Kg catalyst per 100 kg polymer
[2]Total solvent in monomer solution, catalyst solution and separate feed stream, composed of t-butyl alcohol/methyl alcohol, 80/20 by weight.

The melt indices of the copolymers useful in the compositions of this invention are about 0.1 to 30 at 190° C. as determined by ASTM-D-1238-52T. The preferred melt indices are 0.1 to 10.

The copolymers of the present invention can be vulcanized for about 1 to 60 minutes at about 150° to 200° C., preferably 5 to 10 minutes at 160° to 177° C., in the presence of certain piperazinium diphenoxide salts. Suitable piperazinium diphenoxide salts include those derived from piperazine and chloro-substituted phenols such as 2,4,6-chlorophenol, pentachlorophenol and 2-chloro-4-nitrophenol.

Piperazinium diphenoxide salts provide fast cure rates at 177° C. which are from 2.5 to 8 times faster than with an equivalent amount of free piperazine.

The amount of piperazinium diphenoxide salt used in the curing of the present invention ranges from 0.21 to 0.87 mole per mole of glycidyl(meth)acrylate in the copolymer. However, the fastest cure rates, lowest compression sets, highest $M_{100}$ values, lowest $E_B$ and CS values, and the best heat aging properties are obtained using a stoichiometric amount of piperazinium diphenoxide salt, i.e. a molar amount equal to ½ the molar amount of glycidyl(meth)acrylate in the copolymer.

Piperazinium di(2-chloro-4-nitrophenoxide) is particularly preferred for curing the compositions of the present invention and combines very fast cure rates at 177° C. with good processing safety (long Mooney scorch times) at 121° C. and provides vulcanizates with good heat aging properties.

The piperazinium diphenoxide salts can be prepared by adding a solution of 1 molar equivalent of piperazine in 95% ethanol or tetrahydrofuran to a solution of 2 molar equivalents of the requisite phenol in the same solvent at ambient temperature and under nitrogen atmosphere. After the addition is complete, the reaction mixture is stirred for 0.5 hour, cooled to −5° C. and filtered. The filtered product is washed with fresh solvent and dried overnight in a vacuum oven at 50° C. The piperazinium salts are obtained in a very finely divided state and are suitable for use in the invention compositions without further particle size reduction. Table II summarized the preparation and properties of three piperazinium diphenoxide salts falling within the scope of this invention as well as piperazinium diphenoxide which falls outside the invention scope and which will be used for comparative purposes as described hereinafter.

TABLE II

| Piperazinium Di- | Yield % | % N Found | % N Theory | Melting Point (°C.)[1] |
|---|---|---|---|---|
| Phenoxide | 62.2 | 10.1 | 10.2 | 101–103 |
| 2,4,6-Tri- chlorophenoxide | 81.7 | 5.7 | 5.8 | 147–149 |
| 2-Chloro-4- nitrophenoxide | 96.9 | 11.8 | 12.9 | 222–223 |
| Pentachloro- phenoxide | 99.2 | 4.5 | 4.5 | 260 |

[1]Sealed tube

The vulcanizates of the present invention can also contain an antioxidant of the phosphorous ester type or the amine type or a mixture of the two.

Suitable phosphorus ester compounds include:
tri(mixed mono- and dinonylphenyl)phosphite
tris(3,5-di-t-butyl-4-hydroxyphenyl)phosphate
tricresyl phosphate
a high M.W. poly(phenolic phosphonate)
6-(3,5-di-t-butyl-4-hydroxy)benzyl-6H-dibenz[c,e]-[1,2]oxaphosphorin-6-oxide Suitable amine antioxidants include polymerized 2,2,4-trimethyl-1,2-dihydroquinoline, N-phenyl-N'-(p-toluenesulfonyl)-p-phenylenediamine, N,N'-di(β-naphthyl)-p-phenylenediamine; the low temperature reaction product of phenyl(β-naphthyl)amine and acetone, and 4,4'-bis(α,α-dimethylbenzyl)diphenylamine.

The proportion of antioxidant in the vulcanizable composition is about 0.1 to 5 parts, preferably 1 to 3 parts, per 100 parts copolymer (phr).

A preferred antioxidant composition consists of a 1 to 1 by weight mixture of tris(mixed mono- and dinonylphenyl)-phosphite and 4,4'-bis(α,α-dimethylbenzyl)diphenylamine.

Fillers can be added to reduce cost and to improve the mechanical properties of the vulcanizate. A typical vulcanizable composition will usually contain from 0 to 125 phr, preferably from 40 to 60 phr, of a carbon black filler.

The following examples illustrate this invention. All parts, percentages and proportions are by weight unless otherwise specified.

EXAMPLES 1–5

The rubber stocks for each of the examples were prepared by mixing on a water cooled two-roll rubber mill at room temperature 100 parts of a 44.5 E/52.1 MA/3.4 GMA copolymer containing 0.024 mole GMA, 50 parts of SRF carbon black, 1 part of tri(mixed mono- and dinonylphenyl)phosphite, 1 part of 4,4'-bis-(α,α-dimethylbenzyl)diphenylamine, and 0.012 mole of a piperazinium diphenoxide salt curing agent of the type specified in Table III.

The cure rates of the compounded stocks were determined by measuring the maximum slope of Oscillating Disc Rheometer (ODR) curves at 177° according to ASTM Method D-2084-75. The maximum cure rate was obtained by drawing a tangent at the steepest part of the rise of the curing curve on a plot of torque (dN.m) versus time (min.) and dividing the height of the tangent by the time required to transverse that height. Processing safety of the compounded stocks was determined by measuring the Mooney scorch at 121° C. according to ASTM Method D-1646-74 (time in minutes to at 10 point rise in Mooney viscosity). Compression set resistance was measured after 94 hours at 150° C. by ASTM Method D-395-69 (Method B) on Yerzley pellets cured for 20 minutes at 177° C. and on pellets which were subsequently post cured for 4 hours at 177° C.

Table III summarizes the results obtained using piperazinium diphenoxide salts derived from phenol, 2,4,6-trichlorophenol, pentachlorophenol and 2-chloro-4-nitrophenol in comparison with piperazine. All of the salts provided enhanced cure rates when compared to an equivalent amount of piperazine. The piperazinium di(2-chloro-4-nitrophenoxide) salt was outstanding in that it provided a cure rate over 8 times as fast as piperazine itself and also had good processing safety. Although piperazinium diphenoxide increased the cure rate, it was very scorchy and tended to cure at ambient temperature.

Compression sets after 94 hours at 150° C. of Examples 1 to 3 were very similar.

TABLE III

E/MA/GMA CURING STUDY
CURE RATE AND PROCESSING SAFETY OF PIPERAZINIUM
SALTS OF PHENOL AND SUBSTITUTED PHENOLS

| Example No. | Piperazinium Di- | (PHR) | Maximum ODR Slope, dN . m/min, 177° C. | Mooney Scorch, 121° C. | Comp. Set B ASTM D-395-69 94 h/150° C., % A[(1)] | B[(2)] |
|---|---|---|---|---|---|---|
| 1 | 2,4,6-Trichloro phenoxide | (5.9) | 9.8 | — | 84 | 81 |
| 2 | Pentachloro phenoxide | (7.7) | 6.9 | — | 90 | 86 |
| 3 | 2-Chloro-4-nitrophenoxide | (5.4) | 22.6 | 9.4 | 89 | 84 |
| 4 | Phenoxide | (3.39) | 8.6 | [(3)] | — | — |
| 5 | Piperazine | (1.06) | 2.8 | 10.2 | 68 | 47 |

[(1)]A - Press cured 20 minutes at 177° C.
[(2)]B - Post cured 4 hours at 177° C.
[(3)]Scorched at ambient temperature

EXAMPLES 6–11

A series of 42.4 E/54.4 MA/3.2 GMA vulcanizates containing varying amounts of piperazinium di(2-chloro-4-nitrophenoxide) were prepared using the recipe and procedure described in Examples 1 to 5.

The ODR cure rates at 177° C. and Mooney scorch times at 121° C. were determined as previously described. Compression set resistance was measured after 70 hours at 150° C. by ASTM Method D-395-69 (Method B) on pellets press cured for 20 minutes at 177° C. and post cured for 4 hours at 177° C. Table IV summarizes the results.

TABLE IV

E/MA/GMA
CURE RATE AND PROCESSING SAFETY VS
PIPERAZINIUM Di(2-CHLORO-4-NITROPHENOXIDE)
CONCENTRATION

| | Example No. | | | | | |
|---|---|---|---|---|---|---|
| | 6 | 7 | 8 | 9 | 10 | 11 |
| Piperazinium di(2-chloro-4-nitrophenoxide ODR, 60 Minutes at 177° C. | 1.83 | 2.74 | 3.66 | 4.57 | 5.94 | 7.32 |
| Minimum torque, dN . m | 4.4 | 4.1 | 4.0 | 4.2 | 4.0 | 3.8 |
| Maximum torque, dN . m | 16.6 | 25.2 | 32.8 | 38.2 | 37.3 | 38.4 |
| Maximum slope, dN . m/min | 5.0 | 9.8 | 16.3 | 19.7 | 19.7 | 19.7 |
| $T_c$-90, minutes | 9.5 | 5.5 | 4.0 | 3.7 | 2.8 | 3.7 |
| Mooney Scorch, 121° C. | | | | | | |
| Minimum reading | 5.5 | 5.6 | 5.5 | 5.1 | 3.7 | 3.8 |
| Time to 10-pt rise, min | 11.0 | 10.7 | 10.5 | 10.6 | 10.6 | 10.5 |
| Comp. Set B, 70 h/105° C. - Press cure 20 minutes at 177° C. | | | | | | |
| Press cure | 100 | 93 | 87 | 86 | 92 | 94 |
| Post cure, 4 h at 177° C. | 94 | 90 | 84 | 82 | 85 | 88 |

The cure rate increased very rapidly with concentration of the piperazinium salt and reached a plateau at 4.57 phr. A very desirable low $T_c$-90 value of 3.7 minutes, i.e. the time to reach 90% of full cure, was obtained. Mooney scorch times were satisfactory and relatively insensitive to curative concentration.

INDUSTRIAL APPLICABILITY

The vulcanizable compositions of the present invention can be used in a wide variety of industrial applications, including ignition wire jacketing, spark plug boots, hoses, belts, miscellaneous molded boots, seals and gaskets.

BEST MODE

Although the best mode of the present invention, i.e., the single best composition of the present invention, will depend upon the particular desired end use and the specific requisite combination of properties for that use, the single most preferred composition of the present invention is that described in detail in Example 9. Alternatively, if high cure rates and high cure states are desired, higher concentrations of the cure-site monomer would be preferred.

I claim:

1. A vulcanizable elastomeric composition comprising a copolymer consisting essentially of copolymerized units of:
   (a) 25–65 weight percent of a comonomer selected from the group consisting of acrylic and vinyl ester, provided that the acrylic ester is other than glycidyl acrylate and glycidyl methacrylate,
   (b) 2–10 weight precent of a cure-site monomer selected from the group consisting of glycidyl acrylate and glycidyl methacrylate,
   (c) 0–15 weight percent carbon monoxide,
   (d) a complemental amount of ethylene from 30–70 weight percent, and a curing agent selected from the group consisting of piperazinium diphenoxide salts of chloro-substituted phenols.

2. The composition of claim 1 wherein
   (a) the comonomer comprises 50–60 weight percent,
   (b) the cure-site monomer comprises 2–5 weight percent, and
   (c) the ethylene comprises 35–50 weight percent.

3. The composition of claim 1 wherein the comonomer is selected from the group consisting of $C_4$–$C_7$ alkyl acrylates, $C_5$–$C_8$ alkyl methacrylates, and $C_3$–$C_6$ vinyl esters.

4. The composition of claim 1 wherein the comonomer is methyl acrylate.

5. The composition of claim 1 wherein the cure-site monomer is glycidyl methacrylate.

6. The composition of claim 1 wherein the curing agent is piperazinium di-(2-chloro-4-nitrophenoxide).

7. The composition of claim 1 wherein the copolymer consists essentially of copolymerized units of
   (a) about 54.4 weight percent methyl acrylate,
   (b) about 3.2 weight percent glycidyl methacrylate, and
   (c) about 42.4 weight percent ethylene.

8. A method of vulcanizing an elastomeric composition, said composition comprising a copolymer consisting essentially of copolymerized units of:
   (a) 25–65 weight percent of a comonomer selected from the group consisting of acrylic and vinyl ester, provided that the acrylic ester is other than glycidyl acrylate and glycidyl methacrylate,
   (b) 2–10 weight percent of a cure-site monomer selected from the group consisting of glycidyl acrylate and glycidyl methacrylate,
   (c) 0–15 weight percent carbon monoxide,
   (d) a complemental amount of ethylene from 30–70 weight percent, said method comprising mixing with said composition a curing agent selected from the group consisting of piperazinium diphenoxide salts of chloro-substituted phenols.

9. The method of claim 8 wherein the curing agent is mixed with said composition in an amount of 0.21–0.87 moles of curing agent per mole of cure-site monomer in the composition.

10. The method of claim 8 wherein
    (a) the comonomer comprises 50–60 weight percent of the composition,
    (b) the cure-site monomer comprises 2–5 weight percent of the composition, and
    (c) the ethylene comprises 35–50 weight percent of the composition.

11. The method of claim 8 wherein
    (a) the comonomer is methyl acrylate,
    (b) the cure-site monomer is glycidyl methacrylate, and
    (c) the curing agent is piperazinium di-(2-chloro-4-nitrophenoxide).

12. Vulcanized articles produced from the composition of claim 1.

* * * * *